United States Patent [19]

Fukai

[11] Patent Number: 4,620,200

[45] Date of Patent: Oct. 28, 1986

[54] SCAN BEAM VELOCITY-COMPENSATION RECORDING SYSTEM

[75] Inventor: Nobutaka Fukai, Kanagawa, Japan

[73] Assignee: Fuji Photo Film Co., Ltd., Japan

[21] Appl. No.: 780,667

[22] Filed: Sep. 26, 1985

[30] Foreign Application Priority Data

Oct. 8, 1984 [JP] Japan ............................ 59-210660

[51] Int. Cl.[4] .................. G01D 15/14; G01D 9/42; H04N 1/22; G03G 15/00
[52] U.S. Cl. .............................. 346/108; 346/76 L; 346/160; 354/4; 355/8; 355/16; 358/296; 358/302
[58] Field of Search ................. 346/108, 107 R, 76 L, 346/160; 358/302, 296; 355/8, 16; 354/4

[56] References Cited

U.S. PATENT DOCUMENTS 4,307,409 12/1981 Greenig et al. ..................... 346/108
4,387,983 6/1983 Masegi ................................... 355/8
4,422,083 12/1983 Neumann et al. ................... 346/108

Primary Examiner—E. A. Goldberg
Assistant Examiner—Gerald E. Preston
Attorney, Agent, or Firm—Gerald J. Ferguson, Jr.; James E. Bryan; Michael P. Hoffman

[57] ABSTRACT

A recording medium scanning system includes a light source for generating a scanning light beam, a light modulator for modulating the light beam with a modulating signal, and a scanner for scanning a recording medium with the modulated light beam emitted from the light modulator. The scanning speed of a light beam emitted from the scanning means is detected by a scanning speed detector which issues a scanning speed signal indicative of the detected scanning speed. An arithmetic operation such as a multiplication or a division is effected on the scanning speed signal issued from the scanning speed detector and a recording signal. The result of the arithmetic operation is applied as the modulating signal to the light modulator.

4 Claims, 1 Drawing Figure

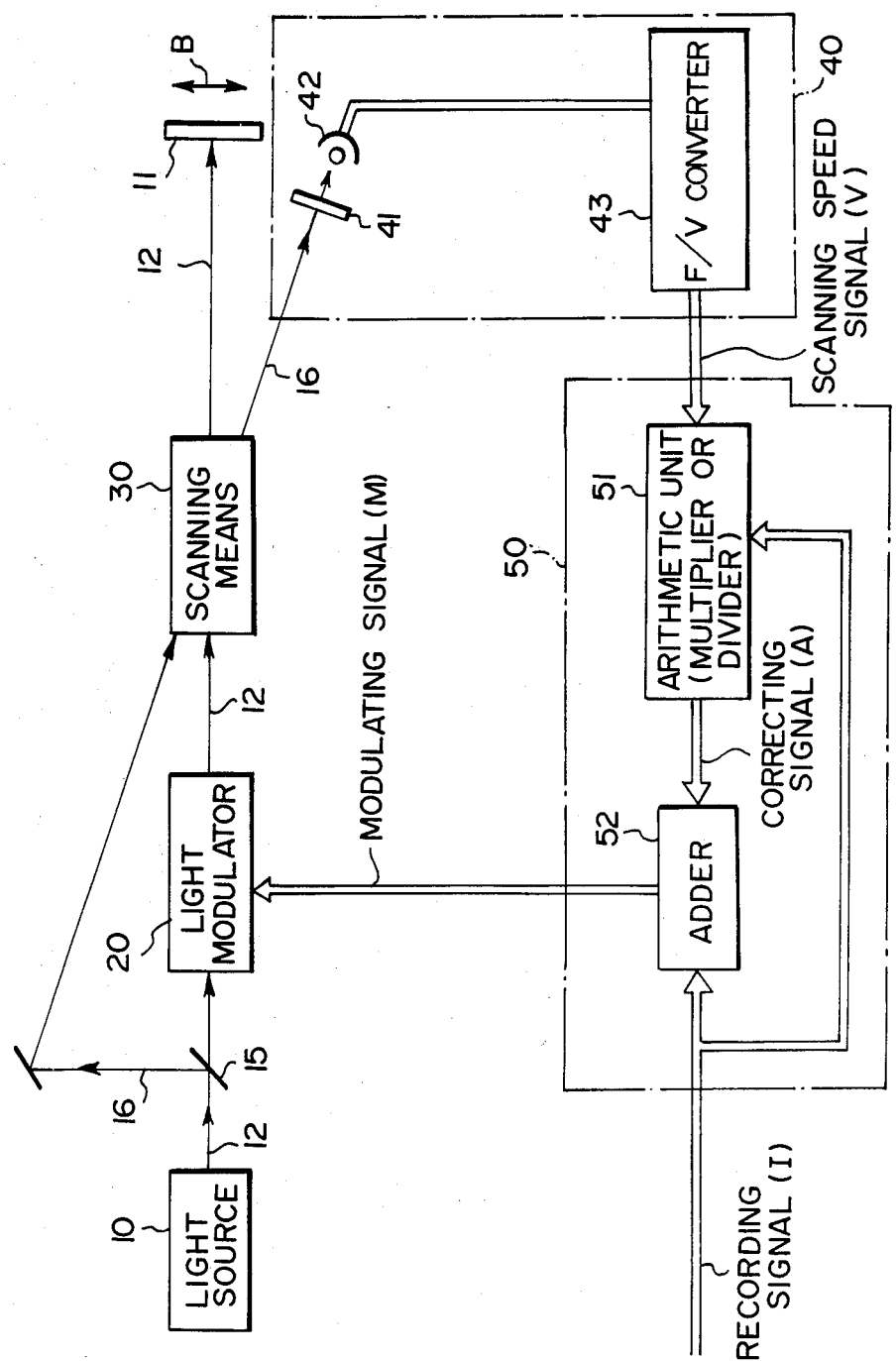

SCAN BEAM VELOCITY-COMPENSATION RECORDING SYSTEM

BACKGROUND OF THE INVENTION

1. Field of the Invention

The present invention relates to a recording medium scanning system for scanning a recording medium with a light beam such as a laser beam modulated by a recording signal to record desired information on the recording medium, and more particularly to such a recording medium scanning device having a scanning speed correcting means for preventing noise produced by variations in the scanning speed of the light beam from being recorded on the recording medium.

2. Description of the Prior Art

One conventional recording medium scanning system includes a light source for generating a scanning light beam, a light modulator for modulating the scanning light beam with a recording signal, and a scanning means for scanning a recording medium with the modulated light beam, or recording light beam, issued from the light modulator.

In the known recording medium scanning system, the recording light beam from the light modulator is deflected by the scanning means, such as a galvanometer mirror, to scan the recording medium which may comprise a film or a photosensitive sheet of paper. At times, the scanning speed at which the recording light beam traverses the recording medium tends to vary due to, for example, a variation in the speed of movement of the scanning means, such as a variation in the swinging movement of the galvanometer mirror. If the scanning speed varies, then the information recorded on the recording medium will contain noise arising from the scanning speed variation. Therefore, such scanning speed variations prevent the desired information from being recorded with high accuracy.

One general solution to the aforesaid problem would be to control the speed of movement of the scanning means for removing undesirable variations from the speed of movement thereof. This speed control process can remove low-frequency speed variations from the speed of movement of the scanning means. However, it is incapable of removing high-frequency speed variations since the scanning means cannot be controlled to follow such high-frequency speed variations.

SUMMARY OF THE INVENTION

In view of the shortcoming of the conventional recording medium scanning system, it is an object of the present invention to provide a recording medium scanning system having a scanning speed correcting means for preventing noise caused by a scanning speed variation from being recorded on a recording medium in a wide frequency range including high-frequency scanning speed variations by correcting a recording signal applied to a light modulator dependent on the scanning speed variation.

A recording medium scanning system according to the present invention essentially includes a scanning speed correcting means comprising a scanning speed detecting means for detecting the scanning speed of a light beam emitted from a scanning means to issue a scanning speed signal indicative of a detected scanning speed, and an arithmetic means for effecting an arithmetic operation on the scanning speed signal issued from the scanning speed detecting means and a recording signal and for applying the result of the arithmetic operation as a modulating signal to a light modulator.

The arithmetic means includes an arithmetic unit for effecting a multiplication or a division on the scanning speed signal and the recording signal dependent on the nature of the recording medium. The arithmetic means may additionally include an adder for adding the result from the arithmetic unit and the recording signal to produce the modulating signal.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWING

The sole FIGURE is a block diagram of a recording medium scanning system according to the present invention.

DESCRIPTION OF THE PREFERRED EMBODIMENT

The recording medium scanning system of the present invention, shown in the sole FIGURE, includes a light source 10, a light modulator 20, a scanning means 30, a scanning speed detecting means 40, and an arithmetic means 50 for effecting an arithmetic operation on a scanning speed signal V and a recording signal I to produce a modulating signal M to be applied to the light modulator 20.

The light source 10 generates a light beam 12 such as a laser beam for scanning a recording medium 11 such as a film or a photosensitive sheet of paper, for example. The light beam 12 is modulated by the light modulator 20, and the modulated light beam 12 is deflected by the scanning means 30 to scan the recording medium 11 for recording information carried by the light beam 12 on the recording medium 11.

The light modulator 20 modulates the light beam 12 applied thereto with the modulating signal M and issues the modulated light beam 12 as a recording light beam which carries the information that has been carried by the modulating signal M. The light modulator 20 may comprise an acoustooptic modulator, an electrooptic modulator, or the like.

The scanning means 30 serves to scan the recording light beam 12 over the recording medium 11. The scanning means 30 may comprise a light deflector such as a galvanometer, a rotating polygonal mirror, a hologram, or the like.

The scanning speed detecting means 40 detects the scanning speed of the recording light beam 12 emitted from the scanning means 30 and generates a signal representative of the detected scanning speed. In the illustrated embodiment, part of the light beam emitted from the light source 10 is extracted by a semi-transparent mirror 15 interposed between the light source 10 and the light modulator 20. The extracted light beam is applied to the scanning means 30 which emits a synchronizing light beam 16 that is deflected thereby at a speed commensurate with that of the recording light beam 12 also emitted from the scanning means 30. The scanning speed detecting means 40 detects the scanning speed of the recording light beam 12 by detecting the speed of the synchronizing light beam 16. The synchronizing light beam 16 may alternatively be obtained by applying a light beam emitted from a separate light source to the scanning means. The scanning speed detecting means 40 for detecting the speed of the synchronizing light beam 16 includes a grid 41 for passage of the synchronizing light beam 16 therethrough, a light detector 42 disposed behind the grid 41 for detecting light pulses having passed through the grid 41 to produce corresponding electric pulses, and a frequency-to-voltage converter 43 for converting the signal from the light detector 42 to a scanning speed signal V. The direction in which the recording medium 11 is scanned with the recording light beam 12 is normal to the sheet of the FIGURE, and the recording medium 11 is also scanned in the secondary scanning mode in the directions of the arrow B. The scanning speed signal V issued from the scanning speed detecting means 40 may be either the signal itself produced directly by the frequency-to-voltage converter 43 or a signal derived by amplifying or otherwise processing the signal from the frequency-to-voltage converter 43.

The arithmetic means 50 basically functions to effect a multiplication or a division on the scanning speed signal V and a recording signal I carrying information to be recorded on the recording medium 11, and also to issue the result as the modulating signal M to the light modulator 20. The arithmetic means 50 may most simply be in the form of a multiplier or a divider. According to the illustrated embodiment, however, the arithmetic means 50 comprises an arithmetic unit 51 (which comprises either a multiplier or a divider) for effecting a multiplication or a division on the signals V and I and issuing the result as a correcting signal A, and an adder 52 for adding the correcting signal A to the recording signal I and issuing the sum signal as the modulating signal M.

By processing the recording signal I and the scanning speed signal V through a multiplication or a division and applying the result as the modulating signal to the light modulator 20, the recording light beam emitted from the light modulator 20 is representative of combined information containing the information to be recorded which is carried by the recording signal I and the information of a scanning speed variation. When the recording light beam is deflected by the scanning means 30 to scan the recording medium 11, the scanning speed variation borne by the recording light signal is canceled out by the variation in the scanning speed of the recording light beam. As a result, only the desired information to be recorded is accurately recorded on the recording medium 11.

The combination of the arithmetic unit 51 and the adder 52 is one preferable form of the arithmetic means 50 for producing the modulating signal M through a multiplication or a division effected on the signals V and I. This signal processing arrangement is effective in removing noise arising from scanning speed variations.

One specific example of the arithmetic process according to the present invention will be described below.

It is assumed that the magnitude of a signal to be recorded on the recording medium 11 is proportional to the amount of exposure to the recording light beam, e.g., a photographic film is employed as the recording medium 11 and the signal is to be recorded on the photographic film with an amount of exposure in the range corresponding to a linear portion of the H and D curve of the photographic film. Then, the amount E of exposure of the recording medium 11 to the recording light beam can be expressed by:

$$E = a\frac{P}{V} \tag{1}$$

where P is the intensity of the recording light beam emitted from the light modulator 20, V is the scanning speed, and a is a constant.

The intensity P of the recording light beam emitted from the light modulator 20 and the modulating signal M applied to the light modulator 20 are related as follows:

$$P = bM^\alpha \tag{2}$$

where b and $\alpha$ are constants.

From the equations (1) and (2), the following equation can be derived:

$$E = ab\frac{M^\alpha}{V} \tag{3}$$

If the scanning speed V changes from Vo to Vo+$\Delta$V, then the following equation should be met in order to remove a variation in the amount E of exposure by changing the modulating signal M from Mo to Mo+$\Delta$M:

$$E|_{\substack{V=Vo+\Delta V \\ M=Mo+\Delta M}} - E|_{\substack{V=Vo \\ M=Mo}} = 0 \tag{4}$$

From the equations (3) and (4), $$ab\left\{\frac{(Mo+\Delta M)^\alpha}{Vo+\Delta V}\right\} - ab\frac{Mo^\alpha}{Vo} = 0 \tag{5}$$

$$ab\frac{Mo^\alpha}{Vo}\left\{\frac{\left(1+\frac{\Delta M}{Mo}\right)^\alpha}{1+\frac{\Delta V}{Vo}} - 1\right\} = 0$$

$$\frac{\left(1+\frac{M}{Mo}\right)^\alpha}{1+\frac{V}{Vo}} - 1 = 0$$

$$\left(1+\frac{\Delta M}{Mo}\right)^\alpha - \left(1+\frac{\Delta V}{Vo}\right) = 0$$

If Mo >> $\Delta$M, then the following approximate expression can be given:

$$\left(1+\frac{\Delta M}{Mo}\right)^\alpha = 1 + \frac{\alpha \cdot \Delta M}{Mo} \tag{6}$$

From the equations (5) and (6), $$1 + \frac{\alpha \cdot \Delta M}{Mo} - \left(1 + \frac{\Delta V}{Vo}\right) = 0 \tag{7}$$

$$\frac{\alpha \cdot \Delta M}{Mo} = \frac{\Delta V}{Vo}$$

$$\Delta M = \frac{\Delta V \cdot Mo}{\alpha \cdot Vo}$$

Since the modulating signal Mo and the recording signal I have the following relationship:

$Mo = \bar{\beta} I$ ($\beta$ is a constant), the equation (7) can be modified as follows:

$$\Delta M = \frac{\Delta V \cdot \beta I}{\alpha Vo}$$

$$= \frac{\{(Vo + \Delta V) - Vo\}\beta I}{\alpha Vo}$$

$$= \frac{(V - Vo)\beta I}{\alpha Vo}$$

$$= -\frac{\beta}{\alpha} \cdot I + \frac{\beta}{\alpha Vo} \cdot V \cdot I$$

Therefore, the modulating signal M is expressed by:

$$M = Mo + \Delta M \quad (8)$$

$$= \beta I - \frac{\beta}{\alpha} \cdot I + \frac{\beta}{\alpha Vo} \cdot V \cdot I$$

$$= \beta \left(1 - \frac{1}{\alpha}\right) I + \frac{\beta}{\alpha Vo} \cdot V \cdot I$$

Inasmuch as $\alpha$, $\beta$ are constants and Vo is of a constant value, $$M = k \cdot I + l \cdot V \cdot I \text{ (k and l are constants)} \quad (9)$$

Therefore, an unwanted variation in the amount of exposure due to a variation in the scanning speed can be eliminated by employing, as the modulating signal M, the sum of the product, as multiplied by a certain constant, of the recording signal I and the scanning speed signal V, and the recording signal I as multiplied by a certain constant.

According to the present invention, the recording light beam contains the information to be recorded which is carried by the recording signal and which is varied by a variation in the scanning speed. When the recording light beam is scanned by the scanning means over the recording medium, the variation contained in the information to be recorded can be canceled out by the variation in the scanning speed. Consequently, only the desired information can accurately be recorded on the recording medium.

Therefore, noise arising from the variation in the scanning speed of the light beam, i.e., the variation in the speed of movement of the scanning means, is prevented from being recorded on the recording medium. Since such undesirable noise is prevented from being recorded by employing the modulating signal which is derived by processing the recording signal and the scanning speed signal, the noise can be removed in a wide frequency range including high-frequency scanning speed variations.

Although a certain preferred embodiment has been shown and described, it should be understood that many changes and modifications may be made therein without departing from the scope of the appended claims.

I claim:

1. A recording medium scanning system comprising:
   (i) a light source for generating a scanning light beam;
   (ii) a light modulator for modulating said light beam with a modulating signal;
   (iii) scanning means for scanning a recording medium with the modulated light beam emitted from said light modulator;
   (iv) scanning speed detecting means for detecting the scanning speed of a light beam emitted from said scanning means to issue a scanning speed signal indicative of the detected scanning speed; and
   (v) arithmetic means for effecting an arithmetic operation on the scanning speed signal issued from said scanning speed detecting means and a recording signal and for applying the result of said arithmetic operation as said modulating signal to said light modulator.

2. A recording medium scanning system according to claim 1, wherein said arithmetic means comprises an arithmetic unit for effecting a multiplication or a division on said scanning speed signal and said recording signal and for producing the result as said modulating signal.

3. A recording medium scanning system according to claim 1, wherein said arithmetic means comprises an arithmetic unit for effecting a multiplication or a division on said scanning speed signal and said recording signal and for producing the result as a correcting signal, and an adder for adding said correcting signal and said recording signal to produce said modulating signal.

4. A recording medium scanning system according to claim 1, wherein said scanning speed detecting means comprises a grid and a light detector disposed behind said grid for detecting the light beam emitted from said scanning means through said grid.

* * * * *